US005819338A

United States Patent [19]

Hession

[11] Patent Number: 5,819,338

[45] Date of Patent: Oct. 13, 1998

[54] PATIENT HOIST

[76] Inventor: Anne F. Hession, 63 Kingshill Drive, Kenton Harrow, Middlesex, England, NA3 8QD

[21] Appl. No.: 924,673

[22] Filed: Sep. 5, 1997

[51] Int. Cl.[6] .............................. A61G 7/12; A61G 7/14; B60P 1/02; B60R 9/06

[52] U.S. Cl. .................................. 5/86.1; 5/83.1; 5/87.1; 280/47.35; 414/495; 414/921

[58] Field of Search ................................ 5/81.1 R, 83.1, 5/86.1, 87.1; 280/47.34, 47.35; 414/921, 495

[56] References Cited

U.S. PATENT DOCUMENTS

| | | | |
|---|---|---|---|
| 3,394,933 | 7/1968 | Benoit | 5/87.1 X |
| 3,790,974 | 2/1974 | Johansson | 5/83.1 |
| 3,914,808 | 10/1975 | Woods | 5/83.1 |
| 3,940,808 | 3/1976 | Petrini | 5/83.1 |
| 4,399,572 | 8/1983 | Johansson | 5/87.1 |
| 4,400,129 | 8/1983 | Eisenberg et al. | 414/921 X |
| 4,761,842 | 8/1988 | Weiner | 5/83.1 |

*Primary Examiner*—Brian K. Green
*Assistant Examiner*—Robert G. Santos

[57] ABSTRACT

An invalid lift assembly is provided including a wheelchair with a pair of side frames each coupled together with a seat therebetween and having a plurality of wheels thereon. Each side frame has a pair of arm rests coupled thereto and extended outwardly therefrom thus defining a pair of lips. Next provided is a wheelchair lift assembly including a base having a pair of spaced parallel members coupled together only at one of the ends thereof by way of an interconnection member. The parallel members each have a wheel coupled to a bottom surface of each of the ends thereof. The wheelchair lift assembly further includes a vertical hydraulic piston having a lower extent coupled to a center of the interconnection member of the base and a pump. The pump is adapted to allow the elevation of a second end of the hydraulic piston. The wheelchair lift assembly further includes a pair of spaced parallel arms coupled together at ends thereof via an intermediate portion which is in turn coupled to the upper extent of the hydraulic piston such that the arms may be removably positioned under the lips associated with the arm rests of the wheelchair. The wheelchair may thus be selectively elevated by way of the hydraulic piston.

7 Claims, 2 Drawing Sheets

PATIENT HOIST

BACKGROUND OF THE INVENTION

1. Field of the Invention

The present invention relates to patient hoists and more particularly pertains to a new PATIENT HOIST for lifting a user within a wheelchair.

2. Description of the Prior Art

The use of patient hoists is known in the prior art. More specifically, patient hoists heretofore devised and utilized are known to consist basically of familiar, expected and obvious structural configurations, notwithstanding the myriad of designs encompassed by the crowded prior art which have been developed for the fulfillment of countless objectives and requirements.

Known prior art patient hoists include U. S. Pat. No. 4,399,572; U.S. Pat. No. 3,962,737; U.S. Pat. Des. No. 352,590; U.S. Pat. No. 4,918,771; U.S. Pat. No. 3,981,484; and U.S. Pat. No. 4,920,628.

In these respects, the PATIENT HOIST according to the present invention substantially departs from the conventional concepts and designs of the prior art, and in so doing provides an apparatus primarily developed for the purpose of lifting a user within a wheelchair.

SUMMARY OF THE INVENTION

In view of the foregoing disadvantages inherent in the known types of patient hoists now present in the prior art, the present invention provides a new PATIENT HOIST construction wherein the same can be utilized for lifting a user within a wheelchair.

The general purpose of the present invention, which will be described subsequently in greater detail, is to provide a new PATIENT HOIST apparatus and method which has many of the advantages of the patient hoists mentioned heretofore and many novel features that result in a new PATIENT HOIST which is not anticipated, rendered obvious, suggested, or even implied by any of the prior art patient hoists, either alone or in any combination thereof.

To attain this, the present invention generally comprises a wheelchair having a pair of side frames each coupled together with a seat therebetween. Each of such side frames has a plurality of wheels thereon. Note FIG. 1. For reasons that will become apparent hereinafter, each side frame has a pair of arm rests coupled thereto and extending outwardly therefrom thus defining a pair of lips. Next provided is a wheelchair lift assembly including a base. Such base has a pair of spaced parallel members coupled together only at one of the ends thereof by way of an interconnection member. The parallel members each have a wheel coupled to a bottom surface of each of the ends thereof. It should be noted that each wheel is adapted to pivot about a vertical axis. The wheelchair lift assembly further includes a vertical hydraulic piston having a lower extent coupled to a center of the interconnection member of the base. A pump handle is provided having a T-shaped configuration. A vertical extent of the pump handle is hingably coupled to the lower extent of the hydraulic piston opposite the parallel members of the base. By this structure, upon the upward and downward reciprocating movement of the pump handle, an upper extent of the hydraulic piston is raised. The wheelchair lift assembly further includes a pair of spaced parallel arms coupled together at ends thereof via an intermediate portion. Such intermediate member is in turn coupled to the upper extent of the hydraulic piston such that the arms may be removably positioned under the lips associated with the arm rests of the wheelchair. As such, the wheelchair may be selectively elevated by way of the hydraulic piston. Finally, an under arm lift assembly is provided including a vertical post removably positioned in a vertical bore formed in the upper extent of the hydraulic piston. The vertical post has attached to a top end thereof a cross bar which in turn has a pair of spaced parallel under arm members attached thereto. Each under arm members has a padded sleeve situated over a free end thereof. As such, a user may place arms over the under arm members and be lifted by way of the hydraulic piston.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new PATIENT HOIST apparatus and method which has many of the advantages of the patient hoists mentioned heretofore and many novel features that result in a new PATIENT HOIST which is not anticipated, rendered obvious, suggested, or even implied by any of the prior art patient hoists, either alone or in any combination thereof.

It is another object of the present invention to provide a new PATIENT HOIST which may be easily and efficiently manufactured and marketed.

It is a further object of the present invention to provide a new PATIENT HOIST which is of a durable and reliable construction.

An even further object of the present invention is to provide a new PATIENT HOIST which is susceptible of a low cost of manufacture with regard to both materials and labor, and which accordingly is then susceptible of low prices of sale to the consuming public, thereby making such PATIENT HOIST economically available to the buying public.

Still yet another object of the present invention is to provide a new PATIENT HOIST which provides in the apparatuses and methods of the prior art some of the advantages thereof, while simultaneously overcoming some of the disadvantages normally associated therewith.

Still another object of the present invention is to provide a new PATIENT HOIST for lifting a user within a wheelchair.

Even still another object of the present invention is to provide a new PATIENT HOIST that includes a wheelchair with a pair of side frames each coupled together with a seat therebetween and having a plurality of wheels thereon. Each side frame has a pair of arm rests coupled thereto and extended outwardly therefrom thus defining a pair of lips. Next provided is a wheelchair lift assembly including a base having a pair of spaced parallel members coupled together only at one of the ends thereof by way of an interconnection member. The parallel members each have a wheel coupled to a bottom surface of each of the ends thereof. The wheelchair lift assembly further includes a vertical hydraulic piston having a lower extent coupled to a center of the interconnection member of the base and a pump. The pump is adapted to allow the elevation of a second end of the hydraulic piston. The wheelchair lift assembly further includes a pair of spaced parallel arms coupled together at ends thereof via an intermediate portion which is in turn coupled to the upper extent of the hydraulic piston such that the arms may be removably positioned under the lips associated with the arm rests of the wheelchair. The wheelchair may thus be selectively elevated by way of the hydraulic piston.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
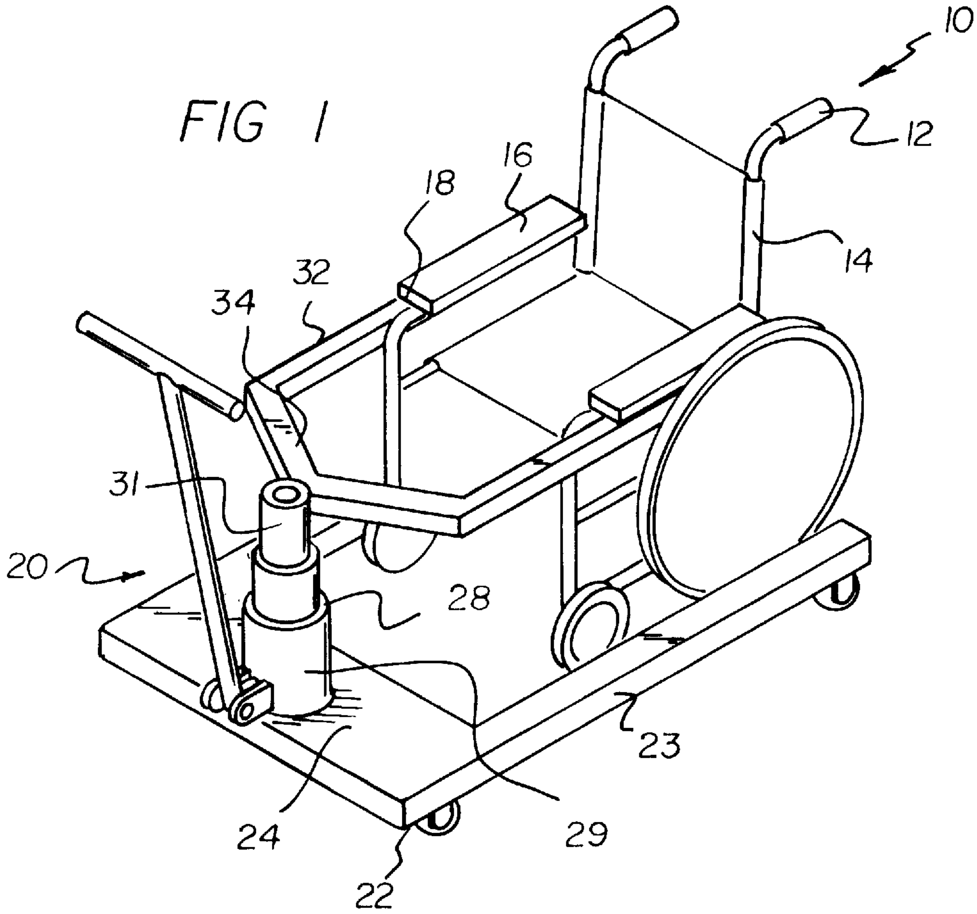
FIG. 1 is a perspective view of a new PATIENT HOIST according to the present invention.
Figure 2:
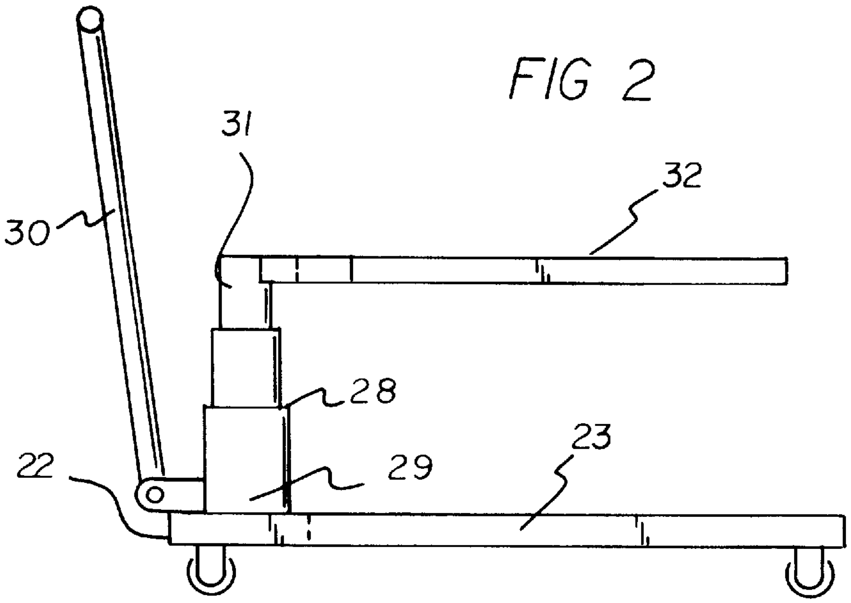
FIG. 2 is a side view of the present invention.

With reference now to the drawings, and in particular to FIGS. 1 through 4 thereof, a new PATIENT HOIST embodying the principles and concepts of the present invention and generally designated by the reference numeral 10 will be described.

The system 10 of the present invention is adapted for use with a wheelchair 12 having a pair of side frames 14 each coupled together with a seat therebetween. Each of such side frames has a plurality of wheels thereon. Note FIG. 1. For reasons that will become apparent hereinafter, each side frame has a pair of arm rests 16 coupled thereto and extended outwardly therefrom thus defining a pair of lips 18.

Next provided is a wheelchair lift assembly 20 including a base 22. Such base has a pair of spaced parallel members 23 coupled together only at one of the ends thereof by way of an interconnection member 24. The interconnection member has a width over twice that of the parallel members. The parallel members each have a wheel 26 coupled to a bottom surface of each of the ends thereof. It should be noted that each wheel is adapted to rotate about a horizontal axis and further pivot about a vertical axis.

The wheelchair lift assembly further includes a vertical hydraulic piston 28 having a lower extent 29 coupled to a center of the interconnection member of the base. A pump handle 30 is provided having a T-shaped configuration. A vertical extent of the pump handle is hingably coupled to the lower extent of the hydraulic piston opposite the parallel members of the base. By this structure, upon the upward and downward reciprocating movement of the pump handle, an upper extent 31 of the hydraulic piston is raised. Lowering of the upper extent may be accomplished by any of various methods known in the hydraulic pump arts. For example, a release valve may be employed. In the alternative, an automatic pump may be utilized so that a user of the wheelchair may more easily effect the raising of the upper extent of the hydraulic piston.

Figure 3:
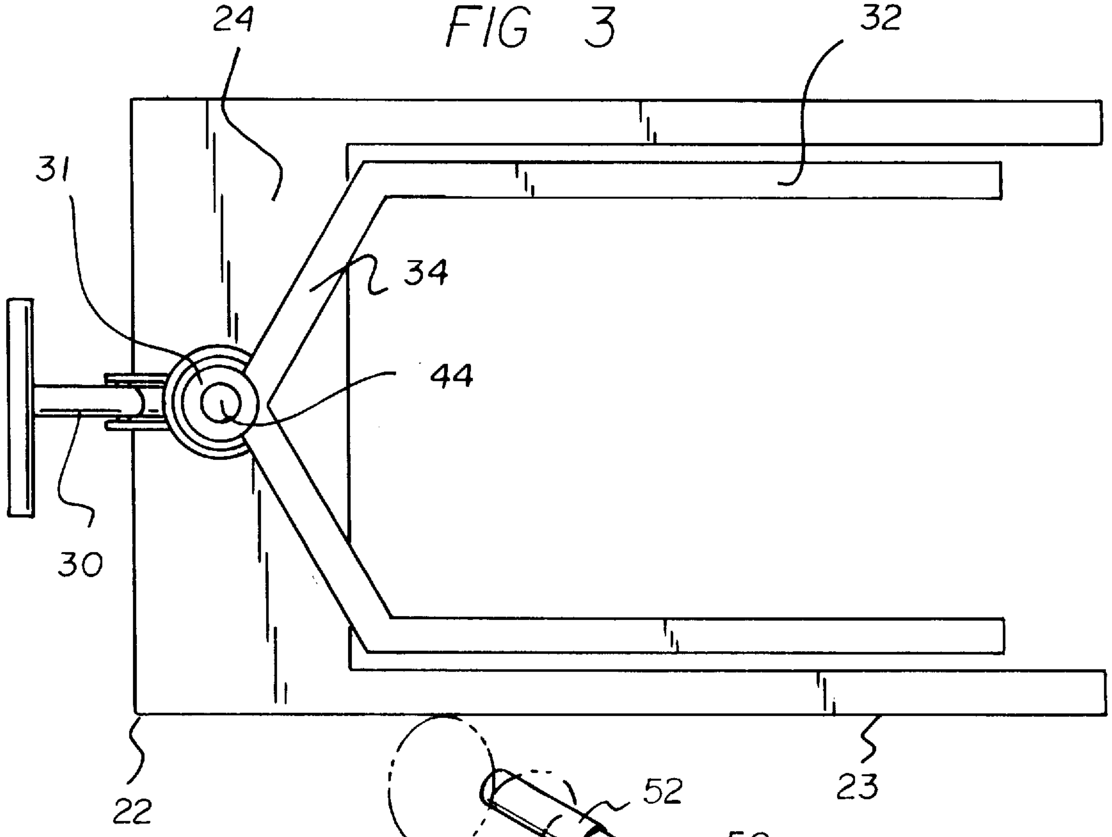
FIG. 3 is a top view of the present invention.
Figure 4:
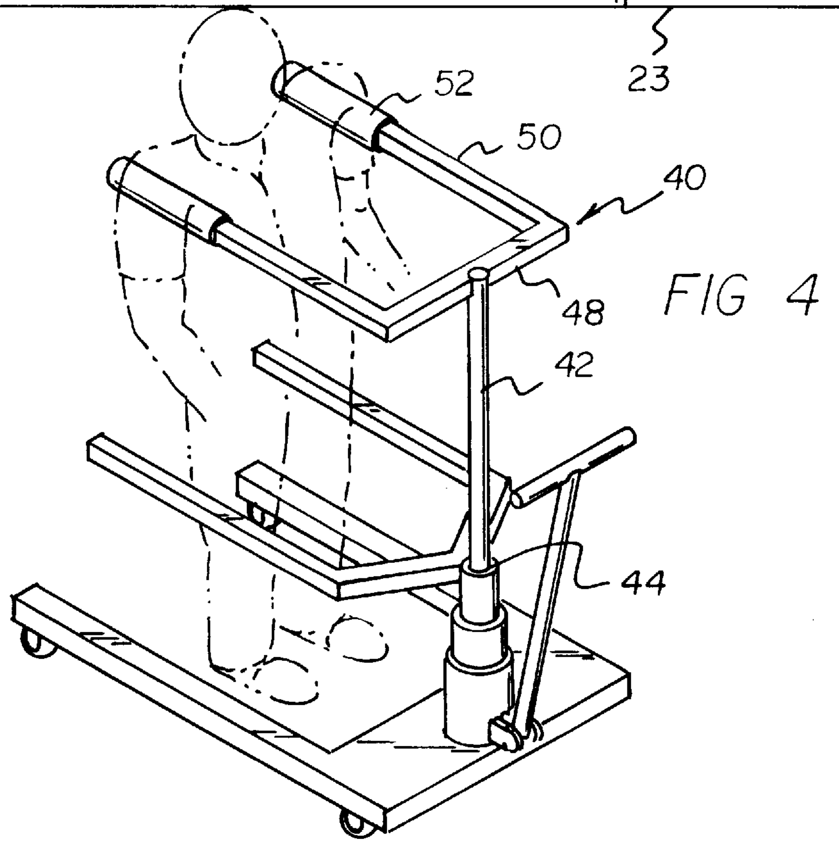
FIG. 4 is a perspective view of the present invention.

The wheelchair lift assembly further includes a pair of spaced parallel arms 32 coupled together at ends thereof via a generally V-shaped intermediate portion 34. Such intermediate member is in turn coupled to the upper extent of the hydraulic piston. As shown in FIG. 3, the spacing between the parallel arms 32 is less than that associated with the parallel members of the base. In use, the arms may be removably positioned under the lips associated with the arm rests of the wheelchair. As such, the wheelchair may be selectively elevated by way of the hydraulic piston. It should be noted that the upper extent of the hydraulic piston is rotatable with respect to the lower extent. As such, the parallel arms 32 may be rotated within a horizontal plane and the wheel chair rotated therewith.

Finally, an under arm lift assembly 40 is provided as an option. The under arm lift assembly includes a vertical post 42 removably and rotatably positioned in a vertical bore 44 formed in the upper extent of the hydraulic piston. The vertical post has attached to a top end thereof a cross bar 48 which in turn has a pair of spaced parallel under arm members 50 attached thereto. Each under arm members has a padded sleeve 52 situated over a free end thereof. As such, a user may place arms over the under arm members and be lifted by way of the hydraulic piston.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An invalid lift assembly comprising, in combination:

a wheelchair with a pair of side frames each coupled together with a seat therebetween and having a plurality of wheels thereon, each side frame having a pair of arm rests coupled thereto and extending outwardly therefrom thus defining a pair of lips;

a wheelchair lift assembly including a base having a pair of spaced parallel members coupled together only at one of the ends thereof by way of an interconnection member, the parallel members each having a wheel coupled to a bottom surface of each of the ends thereof wherein each wheel is adapted to pivot about a vertical axis, the wheelchair lift assembly further including a vertical hydraulic piston having a lower extent coupled to a center of the interconnection member of the base and a pump handle having a T-shaped configuration hingably coupled to the lower extent of the hydraulic piston opposite the parallel members of the base, whereby upon the upward and downward reciprocating movement of the pump handle, an upper extent of the hydraulic piston is raised, the wheelchair lift assembly further including a pair of spaced parallel arms coupled together at ends thereof via an intermediate portion which is in turn coupled to the upper extent of the hydraulic piston such that the arms may be removably positioned under the lips associated with the arm rests of the wheelchair, whereby the wheelchair may be selectively elevated by way of the hydraulic piston; and an under arm lift assembly including a vertical post removably positioned in a vertical bore formed in the upper extent of the hydraulic piston, the vertical post having attached to a top end thereof a cross bar which in turn has a pair of spaced parallel under arm members attached thereto, each under arm members having a padded sleeve situated over a free end thereof, whereby a user may place arms over the under arm members and lifted by way of the hydraulic piston.

2. An invalid lift assembly comprising:

a wheelchair with a pair of side frames each coupled together with a seat therebetween and having a plurality of wheels thereon, each side frame having a pair of arm rests coupled thereto and extending outwardly therefrom thus defining a pair of lips;

a wheelchair lift assembly including a base having a pair of spaced parallel members coupled together only at one of the ends thereof by way of an interconnection member, the parallel members each having a wheel coupled to a bottom surface of each of the ends thereof, the wheelchair lift assembly further including a vertical hydraulic piston having a lower extent coupled to the interconnection member of the base and a pump means, whereby the pump means is adapted to allow the elevation of an upper extent of the hydraulic piston, the wheelchair lift assembly further including a pair of spaced parallel arms coupled together at ends thereof via an intermediate portion which is in turn coupled to the upper extent of the hydraulic piston such that the arms may be removably positioned under the lips associated with the arm rests of the wheelchair, whereby the wheelchair may be selectively elevated by way of the hydraulic piston.

3. An invalid lift assembly as set forth in claim 2 wherein the pump means is a handle hingably coupled to the lower extent of the hydraulic piston opposite the parallel members of the base.

4. An invalid lift assembly as set forth in claim 2 wherein each wheel is adapted to pivot about a vertical axis.

5. An invalid lift assembly as set forth in claim 2 and further including an under arm lift assembly including a vertical post positioned on the upper extent of the hydraulic piston, the vertical post having a cross bar which in turn has a pair of spaced parallel under arm members attached thereto, whereby a user may place arms over the under arm members and be lifted by way of the hydraulic piston.

6. An invalid lift assembly as set forth in claim 5 wherein each under arm member has a padded sleeve situated over a free end thereof.

7. An invalid lift assembly as set forth in claim 5 wherein the under arm lift assembly is removably positioned in a vertical bore formed in the upper extent of the hydraulic piston.

* * * * *